United States Patent [19]

Mauermann et al.

[11] Patent Number: 4,527,525
[45] Date of Patent: Jul. 9, 1985

[54] CONTROL METHOD AND APPARATUS FOR COMBATING KNOCKING IN INTERNAL COMBUSTION ENGINES

[75] Inventors: Walter Mauermann, Stuttgart; Ingo Dudeck, Weinstadt, both of Fed. Rep. of Germany

[73] Assignee: Daimler-Benz Aktiengesellschaft, Fed. Rep. of Germany

[21] Appl. No.: 435,649

[22] Filed: Oct. 21, 1982

[30] Foreign Application Priority Data

Oct. 23, 1981 [DE] Fed. Rep. of Germany ....... 3142082

[51] Int. Cl.³ .......................... F02P 5/14; F02D 37/02
[52] U.S. Cl. ..................................... 123/425; 123/435
[58] Field of Search ...................... 123/425, 435; 73/35

[56] References Cited

U.S. PATENT DOCUMENTS

| 4,153,020 | 5/1979 | King et al. | 123/425 |
| 4,290,398 | 9/1981 | Hattori et al. | 123/425 |
| 4,333,334 | 6/1982 | Nakajima et al. | 123/425 |
| 4,347,820 | 9/1982 | Deleris | 123/425 |
| 4,425,891 | 1/1984 | Kashimura et al. | 123/425 |

Primary Examiner—Parshotam S. Lall
Assistant Examiner—W. R. Wolfe
Attorney, Agent, or Firm—Craig & Burns

[57] ABSTRACT

A control method and apparatus for combating knocking in internal combustion engines which automatically adapts itself to the internal combustion engine to be controlled and, as a result of the automatic adaptation, is capable of employment, without adjustments, on different model-lines and on the individual examples of the internal combustion engines, within these lines and falling within the permissible scatter-range. Anti-knock control is obtained by means of a technique whereby the control input signal (for example, to retard the ignition timing) is increased while knock-signals are occurring, and is reduced if knock-signals do not occur, whereby, following the occurrence of knock-signals, the threshold value for detection of knock-signals is increased, as long as either the knock-signals do not diminish, in spite of the control input signal having been increased, or whereby, if a defined period has elapsed since the last reduction of the control input signal, and knock-signals are not occurring, the threshold value is reduced, or held constant.

16 Claims, 3 Drawing Figures

CONTROL METHOD AND APPARATUS FOR COMBATING KNOCKING IN INTERNAL COMBUSTION ENGINES

The invention relates to control method and apparatus for combating knocking in internal combustion engines, especially in motor vehicles, this control technique employing a knock-sensor and a knock-recognition circuit, the output signals from this circuit—the knock-signals—being obtained by comparing the pre-processed sensor-signals with a threshold value, and being employed for producing a control input signal for the engine control system, see for example, German Patent Specification No. 2,923,056.

The design of known control systems for combating knocking are always referred, with reference to the selection of their parameters (threshold value, knocking-frequency band, etc.), to a particular model-line of internal combustion engines, and serve the individual examples of these engines more or less effectively, depending on the scatter of their operating behavior. Optimum adaptation to the individual engine can be achieved only by individual adjustment.

The invention relates to method and apparatus which adapts itself automatically to the internal combustion engine which is to be controlled, thus adjusting itself, to a certain extent, so that it is capable of being applied, without modifications, to different model lines.

According to the invention, when, during the occurrence of knock-signals (K), the control input signal (Z) is increased, at a defined rise-rate, up to a maximum value, and, if no knock-signals occur, the control input signal is reduced, at a defined decay-rate, down to a minimum value, when, following the occurrence of knock-signals, the threshold value (S) is increased, at a defined rise-rate, up to a maximum value, either for as long as the knock-signals do not diminish, in spite of the control input signal having previously been increased, or, if a defined period (for example 500 ms) has elapsed, since the last reduction of the control input signal without another reduction having taken place, whereupon, if knock-signals are not occurring, the threshold value is reduced to a minimum value, at a defined decay-rate, or is kept constant.

A control system for combating knocking essentially comprises a sensor, which is located at a particular position on the internal combustion engine, and which detects engine-vibrations and/or engine-noises, within a defined frequency band, and which passes on these noises, and/or vibrations, to a knock-recognition circuit, in which they are compared with a reference value, or threshold value, which is either constant, or which, for example, is derived from the sensor signal itself.

The portions of the sensor signal which exceed the threshold value are processed to produce a control input signal, which is applied to the time-point at which ignition is initiated, in the sense of a retarding adjustment. However, the knock-signal is not always proportional to the "knocking" which is actually occurring, since this can be distinguished from other noises only with great difficulty, since these other noises are likewise passed on, by the sensor, to the knock-recognition circuit.

A fundamental problem affecting the recognition of engine-knocking is posed by the fact that signals are also generated (for example, through structure-borne noise) when the engine is in an operating condition which is not accompanied by knocking, these signals (caused, for example, by piston-canting, valve-bottoming, or similar effects) being very similar, in terms of their intensity, pulse-shape and spectral composition, to the shocks which result from knocking.

Nevertheless, these signals can be distinguished from the shocks resulting from knocking, if account is taken of the fact that knocking-induced shocks are generally eliminated by retarding the ignition ignition (or by other knock-inhibiting measures), while "interferring noises" do not change as a result of adjustments to the ignition. This means that "disturbances" can be identified, in terms of their nature, by means of the control behavior of the control system for combating knocking. The criterion for this identification is that a disturbance is present when the retarding adjustment of the ignition does not lead to a decrease in the intensity or frequency of the knocking, this criterion being readily amenable to electronic interrogation.

The control technique, according to the invention, is accordingly designed in such a manner that it checks whether an increase in the control input signal, brought about by a knock-signal, that is to say, a retarding adjustment of the time-point at which ignition is initiated, bring about the disappearance of the knock-signal, or a reduction in this signal. Should this happen, the retarding adjustment is slowly cancelled. Should, however, this not be the case, it is assumed that the disturbance was not associated with knocking, whereupon the retarding adjustment is immediately canceled, and the threshold value is raised until the knock-signal disappears.

If no further disturbance is recognizes, the threshold value decreases again, with a time constant which is large in comparison with the time constant governing the increase of this value. By this means, the situation is avoided, in which the engine runs, throughout the entire duration of the disturbance, with ignition values which are unfavorable with regard to its fuel consumption. The maximum extent to which the threshold value is increased is limited to a level such that no critical reduction in the knocking-susceptibility occurs. Should no further reductions occur within a defined time interval since the last reduction of the control input signal, which definitely means that the knock-signals are not disappearing as the ignition is progressively retarded, this is accordingly a further indication that the threshold value is too low, and this value is thereupon increased, until the knock-signals and the control input signal have decreased again.

The control technique according to the invention thus amounts to an adaptive control process, which either produces the threshold value on its own, or modifies this value for the purpose of suppressing the disturbance.

Instead of adjusting the time-point at which ignition is initiated, in the sense of its retardation, the control input signal can also initiate other knock-inhibiting measures, for example, in the case of engines with exhaust-gas turbochargers, a reduction in the boost pressure.

Further details of the invention can be inferred from the following description of an illustrative embodiment of a device for implementing the technique.

It is an object of the invention to provide method and apparatus for improved control of knocking in internal combustion engines.

It is another object of the invention to provide improved control of knocking internal combustion engines wherein a pre-processed sensor signals are compared with a threshold value to produce knock-signals, a control input signal is produced in response to the knock-signals which, while knock-signals are occurring is increased at a defined rise rate up to a maximum value and which, if no knock-signals occur is reduced at a defined decay rate down to a minimum value and the threshold value is increased following occurrence of knock-signals at a defined rise rate up to a maximum value, either for as long as the knock-signals do not diminish inspite of the control input signal having previously been increased whereupon if this happens the increase of the control signal is discontinued, or, if a defined period has elapsed since the last reduction of the control input signal without another reduction having taken place, whereupon if knock-signals are occurring, the threshold value is reduced to a minimum value at a defined decay rate or is held constant.

It is another object of the invention to provide improved method and apparatus or combating knocking in internal combustion engines wherein a knock recognition circuit receives a signal indicating knock or the absence thereof, a knock-intensity detector means generates an output signal if the knock intensity does not diminish, a control input-signal detector means generates output signal when the control input signal has been increased, an AND element receives output from the knock-intensity detector means and the input-signal detector means, a timing means monitors the intervals between the time-points at which the control input signal was reduced and generates an output signal when a defined period is exceeded, an OR element receives the output signals from an AND element and of the timing means and a threshold-value generator means receives the output of the OR element for increasing the threshold value when an output signal from the OR element is present and for reducing the threshold value when no such output signal is present, the output terminal of the threshold-value generator means being connected to the knock-recognition circuit means.

These and other objects, features, and advantages of the present invention will becomre more apparent from the following description when taken in connection with the accompanying drawings which show, for purposes of illustration only, one embodiment in accordance with the present invention, and wherein.

Figure 1:
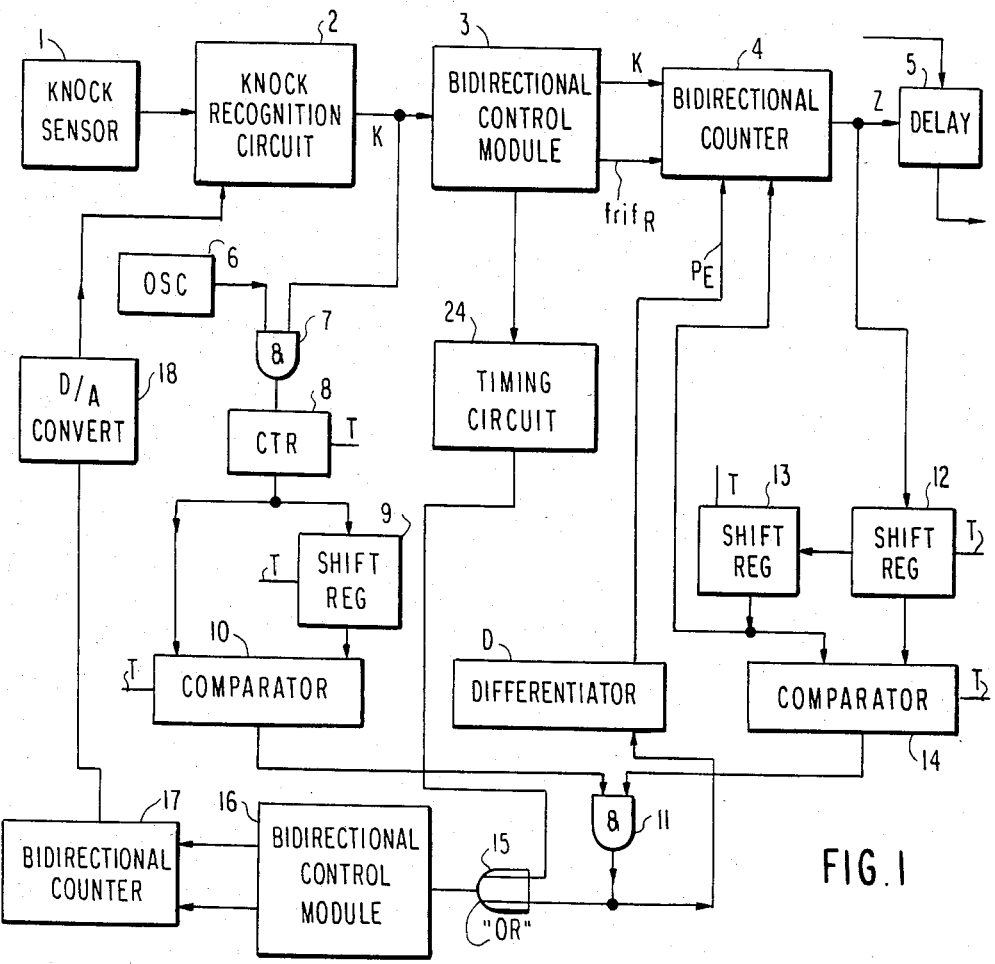
FIG. 1 shows a block circuit diagram of the device.

The block circuit diagram, according to FIG. 1, shows a knock-sensor 1, which is located at a particular position on the engine which is to be controlled, which is not represented. This block circuit diagram also shows a knock-recognition circuit 2, of the type described, for example, in German Patent Specification No. 2,923,056, with the exception of the means for producing the threshold value, the knock-sensor supplying its signals to this recognition circuit. The pre-processed knock-signal appears at the output terminal of the knock-recognition circuit 2, this signal being capable of signifying either "knocking", or another "disturbance," and being supplied to the control-signal generator, which comprises a bidirectional control module 3, a bidirectional counter 4, and a delay element 5. The ignition signal, produced in a generator, not represented in FIG. 1, in accordance with the engine operating conditions and normally triggered at, or close to, the knock-limit, is delayed, by a greater or lesser amount, in the delay element 5 in accordance with the output signal from the bidirectional counter 4, before being supplied to an ignition switching unit, also omitted from FIG. 1. The maximum delay, expressed in terms of crankshaft angle, can, for example, amount to 20°.

Figure 2:
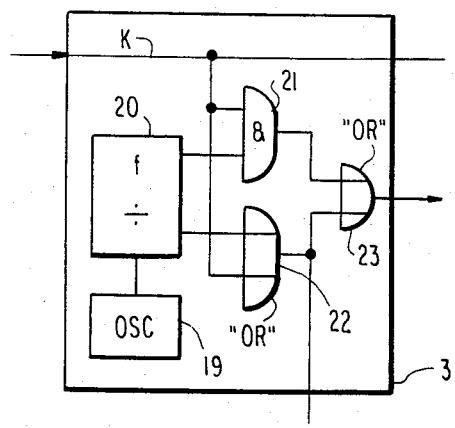
FIG. 2 shows a block circuit diagram of a bidirectional control module.

The bidirectional control module 3 is represented in more detail in FIG. 2. It comprises an oscillator 19, with a frequency divider 20, connected in series therewith, this frequency divider generating a forwards counting signal, $f_f$, which has a defined frequency, and a backwards-counting signal, $f_B$, which has a frequency considerably lower than that of the forwards-counting signal. The forwards-counting signal, $f_f$, is supplied to one of the input terminals of an AND element 21, while the backwards-counting signal, $f_B$, is supplied to one of the terminals of a NOR element 22. The knock-signal K is led to the two other input terminals of the AND and NOR elements. The outputs of the AND element 21 and of the NOR element 22 lead, in each case, to one of the input terminals of an OR element 23, the output from which constitutes the output of the bidirectional control module 3.

The mode of operation of the bidirectional control module 3 is as follows: when a knock-signal K appears ("1"-signal at the output terminal of the knock-recognition circuit 2), the AND element 21 is opened for the forwards counting signal, $f_f$, while the NOR element 22 is, conversely, disabled. If no knock-signal is present ("0"-signal), the NOR element 22 is opened for the backwards-counting signal, $F_B$, and the AND element is disabled, so that either the forwards-counting signal or the backwards-counting signal appears at the output terminal of the OR element 23. As can also be seen from FIG. 1, the output terminal of the OR element 23 is connected to the input terminal of the bidirectional counter 4, which counts forwards, at the frequency of the forward-counting signal, $f_f$, when a knock-signal K is present, and counts backwards, at the frequency of the backwards-counting signal, $f_B$, when no knock-signal is present. The counter is constructed in such a manner that, on reaching its greatest contents-reading when counting forwards, it remains at this reading, and does not reset itself to zero, while when counting backwards, it correspondingly remains at zero. In addition, the counter possesses a "preset enable" input terminal, via which any desired contents can be written into it, this facility being discussed again later.

The instantaneous counter-reading is the control input signal Z, which is assigned to the ignition retard-adjustment. For example, in the case of a four-digit binary counter, which can contain, at the maximum, "16," and a maximum ignition regard-adjustment, expressed in terms of crankshaft angle, of 20°, an increase in the counter-reading by the number 1 thus corresponds to a retard-adjustment through a crankshaft angle of 1.25°.

The knock-intensity detector contains an oscillator 6, which supplies a signal, which has a defined frequency, to one of the input terminals of an "AND" element 7, the knock-signal K being supplied to the other input terminal of this element. The output terminals of the AND element 7 is connected to the input terminal of a counter 8, the contents of which can be transcribed to a shift register 9, and to a comparator 10. The contents of the shift register can likewise be transcribed to the comparator.

The mode of operation of the knock-intensity detector is as follows: when knock-signals occur, the signal from the oscillator 6 is applied, via the AND element 7, to the input terminal of the counter 8, which, as it were, counts out the knock-intensity digitally, so that its counter-reading K* is thus proportional to the knock-intensity. The counter 8, the shift register 9, and the comparator 10 function under clock-control. The clock frequency is controlled so that it is proportional to the engine speed, and the clock signal T is composed of a "1"-signal, which is interrupted by short "0"-signal-pulses. During the clock pulse ("1"-signal), the counter is enabled to count, while during the clocking pause ("0"-signal-pulse) the contents of the counter 8 and of the shift register 9 are first transcribed into the comparator 10, after which the contents of the counter 8 are transcribed to the shift register 9 and, finally, the counter 8 is reset to the zero reading. In the comparator 10, there are thus, with the counter-reading K*, on the one hand, a number which is proportional to the knock-intensity during the last clock pulse, and, with the shift-register contents, a number which is proportional to the knock-intensity during the penultimate clock pulse. During the operations of transcribint the contents of the counter 8 into the shift register 9, and of resetting the counter 8, the comparator 10 generates the difference: counter-reading minus shift-register contents=$\Delta K^*$ and, if $\Delta K^*$ is equal to, or greater than, 0, that is to say, when the knock-signal has not, therefore, diminished from the penultimate clock pulse to the last clock pulse, emits a "1"-signal at its signal output terminal.

The control input-signal detector comprises two successive (in this illustrative embodiment parallel) shift registers 12 and 13, the output terminals of which are connected to the input terminals of a comparator 14. The input terminal of the first shift register 12 is connected to the output of the bidirectional counter 4. The sequential control of the control input-signal detector is effected by means of the same clock pulses T which control the operation of the knock-intensity detector, in the following manner: During each clocking pause, the contents of the two shift registers, 12 and 13, are first written into the comparator 14, after which the contents of the first shift register 12 are transcribed into the second shift register 13, and, last of all, the instantaneous counter-reading (control input signal Z) of the bidirectional counter 4 is written into the first shift register 12. As soon as the contents of the shift registers have been written into the comparator 14, the latter generates the difference: contents of the first shift register 12 minus the contents of the second shift register 13=$\Delta Z$, and if $\Delta Z$ is greater than 0, emits a "1"-signal at its signal output terminal. Since the counter-reading Z of the bidirectional counter 4 corresponds to the situation at the end of the last clock pulse and, accordingly, the contents of the first shift register 12 correspond to the counter-reading for the penultimate pulse, while the contents of the second shift register 13 correspond to the counter-reading of the last pulse but two, a "1"-signal, at the output terminal of the comparator 14, thus signifies that the control input signal Z (for retarding the ignition) has increased, from the last pulse but two, to the penultimate pulse.

The outputs from the pulse-intensity detector and from the control input-signal detector, namely of the comparators 10 and 14, lead to the inputs of an AND element 11, a "1"-signal appearing, at the output terminal of this element, if the following statement applies:

"Although, from the last clock pulse but two, to the penultimate clock pulse, the ignition regard-adjustment increased, the knock-signal did not diminish from the penultimate clock pulse, to the last clock pulse."

As already mentioned, this condition is not interpreted as engine-knocking, but as some other kind of "disturbance," and must be canceled, according to the invention, by bringing the counter-reading of the bidirectional counter 4 to the value corresponding to the last clock pulse but two, on the one hand, thus cancelling the ignition regard-adjustment, and, on the other hand, by raising the threshold value for the knock-recognition process.

The first measure is accomplished by connecting the output terminal of the second shift register to the bidirectional counter 4, in addition to its connection to the comparator 14, so that the contents of the second shift register 13 are continuously presented to this bidirectional counter 4, but can be written into it only when the "preset enable" input terminal (PE), mentioned previously, is carrying a "1"-signal. This "preset enable" input terminal is accordingly connected to the output terminal of the AND element 11, a differentiator D being located, between the two, in order to carry out the writing-in operation, into the bidirectional counter, before the operation in which the contents of the shift registers are transcribed.

The second measure, namely the raising of the threshold value, is accomplished in a threshold-value generator, which comprises a bi-directional control module 16, a bidirectional counter 17, and a digital-to-analog converter 18. The output signal from the AND element 11 is the input signal to the threshold-value generator. The construction of the bidirectional control module 16 is identical to that of the bidirectional control module 3 in FIG. 2, but possibly employs a different oscillator and forwards/backwards counting frequency. In the same manner as in the control-signal generator, the bidirectional counter 17 counts forwards when a "1"-signal is present at the output terminal of the AND element 11, and counts backwards when no such signal is present. The counter-contents are converted, in the digital-to-analog converter 18, into an analog value, which forms the threshold value for the knock-recognition circuit 2.

A further measure is provided for the case when an excessively long period elapses between two occasions on which the control input signal Z is reduced. A situation of this kind can occur if the control input signal Z is increased to its maximum value, without being followed, after a certain time, by a knock-free phase, resulting from a fall in the knock-intensity. For this purpose, a timing element 24 is provided, this element being formed by a one-shot multivibrator, which can be re-triggered, triggering being effected by the backwards-counting signals $f_B$ at the output of the NOR element 22 and, as long as these signals appear at intervals of less than, for example, 500 ms, prevent a "1"-signal from appearing at the output terminal of this timing element 24. The outputs of the timing element 24 and of the AND element 11 lead, via an OR element 15, to the input terminal of the threshold-value generator. A "1"-signal at the utput terminal of the timing element 24 thus causes the threshold value to be raised, this process continuing moreover, until backwards-counting signals, $f_B$, reappear, and the timing element is reset again.

Figure 3:
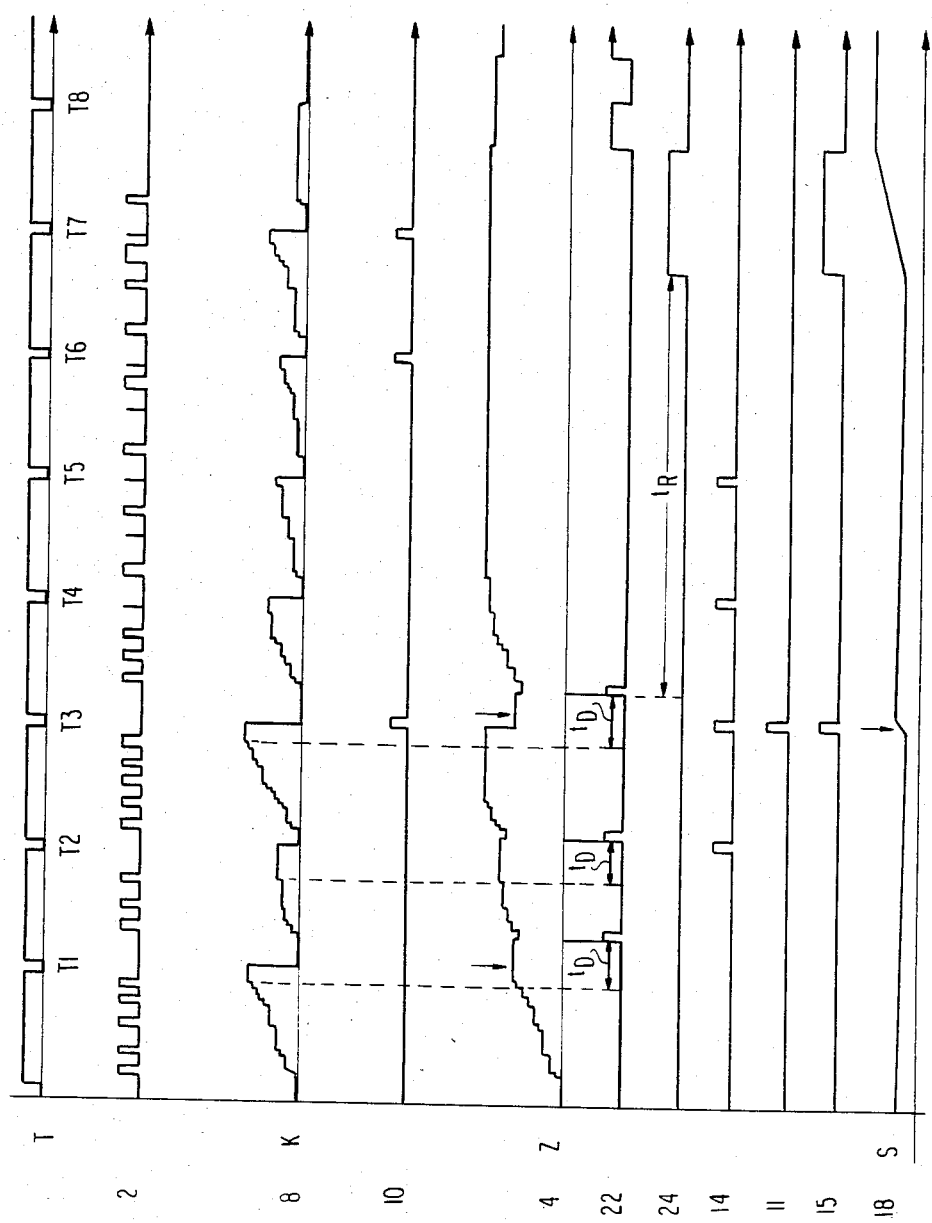
FIG. 3 shows a pulse-sequence diagram.

FIG. 3 shows a pulse-sequence diagram of the control system for combating knocking according to FIG. 1. Pulse-sequences are plotted on this diagram, one above another, these sequences being individually distinguished by the reference numbers of the elements shown in FIG. 1, at the output terminals of which they occur, these reference numbers being indicated on the left-hand side of the diagram. The pulse-sequence on the uppermost line represents the clock pulses P, which control the operating-sequences of the knock-intensity and control input-signal detectors. On the next line below, knock-signals are represented, as they appear at the output terminal of the knock-recognition circuit 2. The third pulse-sequence represents the counter-reading of the counter 8, which is reset to zero during every clocking pause. On the next line below, the output signals from the comparator 10 are plotted, followed by the control input signal Z, as the counter-reading of the bidirectional counter 4, the backwards-counting signal at the output of the NOR element 22, the output signal from the timing element 24, and the output signals from the comparator 14, from the AND element 11, from the OR element 15, and from the digital-to-analog converter 18. This last pulse-sequence represents the threshold value S for the knock-recognition process. These pulse-sequences are self-explanatory in the context of the description of the illustrative embodiment.

As an example of a "disturbing" signal, it may be stated that the knock-intensity K* has increased, from clock pulse T2 to clock pulse T3, although the control input signal Z was likewise increased from T1 to T2. At the end of pulse T3, the control input signal Z is thus restored to its value at the end of pulse T1, see arrows on the pulse-sequence Z, at T1 and Tw, and the threshold value S is simultaneously increased, see arrow. The backwards-counting signal, $f_B$, at the output of the NOR element 22, takes the form of a symmetrical rectangular pulse-signal, as indicated at the right-hand end of the plotted pulse-sequence, the corresponding counter, in the divider 20, being reset to 0 by each knock-intensity pulse, K*, which occurs, so that, with each of these pulses the pause, $t_D$, between the pulses of the backwards-counting signal recommences anew, and the period of time corresponding to the positive pulse ends—see the first three pulses.

After pulse T4, the control input signal Z reaches its maximum value, so that, after the third pulse, at the output of the NOR element 22, backwards-counting signals no longer appear. Accordingly, after the time $t_B$ has elapsed, the timing element 24 is triggered, as a result of which the threshold value S is raised until a backwards-counting signal reappears at the output terminal of the NOR element 22, this signal causing the control input signal to be reduced.

The transfer of the values, into the counters, shift registers, etc., can be carried out either in parallel, or sequentially, with appropriate alteration of the clock pulse-signals, parallel-transfer having been assumed in the description of the illustrative embodiment, without mentioning this assumption explicitly.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A control method for combating knocking in internal combustion engines, the control method comprising the steps of
    comparing pre-processed sensor-signals with a threshold value (S) to produce knock-signals (K),
    producing a control input signal (Z) in response to the knock-signals (K) for controlling an engine, which while knock-signals (K) are occurring, is increased, at a defined rise-rate, up to a maximum value, and which,
    if no knock-signals occur, is reduced, at a defined decay-rate, down to a minimum value,
    increasing the threshold value (S) following the occurrence of knock-signals, at a defined rise-rate, up to a maximum value,
    (a) either for as long as the knock-signals do not diminish, in spite of the control input signal (Z) having previously been increased, whereupon, if this happens, increase of the control input signal (Z) is discontinued, and
    (b) if a defined period has elapsed, since the last reduction of the control input signal (Z), without another reduction having taken place, whereupon, if knock-signals (K) are not occurring, the threshold value (S) is reduced to one of a minimum value at a defined decay-rate, and constant value.

2. Apparatus for combating knocking in internal combustion engines comprising
    a knock-recognition circuit means for receiving a sensed signal,
    a knock-intensity detector means for generating an output signal if the knock-intensity (K*) does not diminish,
    a control input-signal detector means for generating an output signal when a control input signal (Z) has been increased,
    an AND element to which output terminals of the knock-intensity detector means and of the control input-signal detector means are connected and having output terminals,
    a timing means for monitoring intervals between time-points at which the control input signal (Z) was reduced, and for generating an output signal when a defined period is exceeded,
    an OR element to which the output terminals of the AND element and of the timing means are connected and having an output terminal,
    a threshold-value generator means with output terminal being connected to the output terminal of the OR element for increasing a threshold value (S) when an output signal from the OR element is present, and for reducing this threshold value when no such output signal is present,
    the output terminal of the threshold-value generator means being connected to the knock-recognition circuit means.

3. The apparatus according to claim 2, wherein
    the knock intensity detector means comprises an oscillator together with a first AND element, means, with output terminal, for counting a shift register, means for comparing an output from the oscillator being led to one of input terminals of the first AND element and an output from the knock-recognition circuit means being led to a second input terminal of the first AND element the AND element having an output terminal which is connected to an input terminal of the means for counting, the output terminal of the means for counting being connected to an input terminal of the shift register, and the respective output terminals of the shift register and of the means for counting are connected to input terminals of the means for comparing an output from which constitutes the output of the knock-intensity detector, the means for counting forwards at an oscillator frequency during the occurrence of knock-signals within a clock pulse after which, during clocking pause, a counter-reading is compared, in the means for comparing, with the contents of the shift register, the means for comparing emitting a signal at its output terminal, in the event of a counter-reading being equal to, or greater than, the contents of the shift register, a counter-reading being transferred into the shift register and the means for counting thereafter being reset to 0, before the next clock pulse starts.

4. The apparatus according to claim 2, further comprising a control-signal generator means having a bidirectional control module comprising at least a NOR element, a one-shot multivibrator, which can be retriggered as a timing element, the multivibrator being triggered by an output signal from the NOR element.

5. The apparatus according to claim 2, wherein the threshold-value generator means comprises a bidirectional control module and a bidirectional counter, and a digital-to-analog converter means series-connected after the bidirectional counter for producing a threshold value signal (S) for a knock-recognition function.

6. Apparatus as set forth in claim 2, further comprising a control-signal generating means having at least a bidirectional counter, and wherein the control input-signal detector means comprises at least first and second shift registers, an output of the first shift register is connected to the input of second shift registers, and output terminal means for the AND element connected to a "preset enable" input terminal of the bidirectional counter for effecting replacement of the contents of the bidirectional counter by the contents of the second shift register whenever a signal occurs at the output terminal of the AND element.

7. The apparatus according to claim 2, further comprising a control-signal generator means having at least a bidirectional counter, and wherein the control input-signal detector means comprises a first shift register with output terminal, a second shift register, and a comparator, an input terminal of the first shift register being connected to an output terminal of the bidirectional counter of the control-signal generator means, while an output terminal of the first shift register is connected to an input terminal of the second shift register, and respective output terminals of the two shift registers are connected to input terminals of the comparator, means for replacing the contents of the second shift register in a cyclic manner, by the contents of the first shift register, while the contents of the latter are replaced by the instantaneous reading of the bidirectional counter, and the contents of the two shift registers are, thereafter, compared with each other in the comparator which emits an output signal if the contents of the first shift register exceed the contents of the second shift register.

8. The apparatus according to claim 7, further comprising output terminal means for the AND element connected to a "preset enable" input terminal of the bidirectional counter for effecting replacement of the contents of the bidirectional counter by the contents of the second shift register whenever a signal occurs at an output terminal of the AND element.

9. Control technique for combating knocking in internal combustion engines, especially in motor vehicles, this control technique employing a knock sensor and a knock-recognition circuit, the output signals from this circuit—the knock signals—which are obtained by comparing the preprocessed sensor-signals with a threshold value, being utilized for controlling the engine, these signals being employed producing a regulating input signal which, while knock signals (K) are occurring, is increased, in a regulating device, at a defined rise rate, up to a maximum value, and which, if no knock signals occur, is reduced at a defined decay rate down to a minimum value, characterized in that, following the occurrence of knock signals, the threshold value (S) is increased, at a defined rise rate, up to a maximum value, either for as long as the knock signals do not diminish, in spite of the regulating input signal (Z) having previously been increased, whereupon, if this happens, this increase of the regulating input signal is discontinued, or, if a defined period (for example 500 ms) has elapsed since the last reduction of the regulating input signal, without another reduction having taken place, whereupon, if knock signals are not occurring, the threshold value is reduced to a minimum value at a defined decay rate or is held constant.

10. Device for implementing the control technique according to claim 9, characterized in that a knock intensity detector is provided which generates an output signal if the knock intensity ($K^*$) does not diminish, a regulating input signal detector is provided which generates an output signal when the regulating input signal (Z) was increased, an AND element is provided, the output terminals of the knock intensity detector and of the regulating input signal detector being connected via the input terminals of this element, a timing element is provided which monitors the intervals between the time points at which the regulating input signal (Z) was reduced, and generates an output signal when a defined period is exceeded, an OR element is provided, the output terminals of the AND element and of the timing element being connected via the input terminals of this element, a threshold value generator is provided, its input terminal being connected to the output terminal of the OR element, this threshold value generator increasing the threshold value (S) when an output signal from the OR element is present, and reducing this threshold value when no such output signal is present, and in that the output terminal of the threshold value generator is connected to the knock recognition circuit.

11. Device according to claim 10, characterized in that the knock intensity detector comprises an oscillator, together with an AND element, a counter, a shift register, and a comparator, the output from the oscillator being led to one of the input terminals of the AND element and the output from the knock recognition circuit being led to the other input terminal of this AND element, the output terminal of which is connected to the input terminal of the counter, in that the output terminal of the counter is connected to the input terminal of the shift register, and in that the respective output terminals of the shift register and of the counter are connected to the input terminals of the comparator, the output from which constitutes the output of the knock intensity detector, the counter counting forward at the oscillator frequency, during the occurrence of knock signals within a clock pulse after which, during clocking pause, the counter-reading is compared in the comparator with the contents of the shift register, the comparator emitting a signal at its output terminal in the event of the counter-reading being equal to or greater than the contents of the shift register, the counter-reading being transferred into the shift register and the counter thereafter being reset to 0, before the next clock pulse starts.

12. Device according to claim 10, characterized in that the output terminal of the AND element is connected to a "preset enable" input terminal of the bidirectional counter, and that the contents of the bidirectional counter are replaced by the contents of the second shift register whenever a signal occurs at the output terminal of the AND element.

13. Device according to claim 10, characterized in that a one-shot multivibration, which can be retriggered, is provided as the timing element, this multivibrator being triggered by the output signal from the NOR element which is present in the bidirectional control module of the regulating device.

14. Device according to claim 10, characterized in that the threshold value generator possesses a bidirectional control module and a bidirectional counter, and in that a digital-to-analog converter is series-connected after the bidirectional counter, the threshold value (S) intended for the knock recognition function appearing at the output terminal of this converter.

15. Device according to claim 10, characterized in that the regulating input signal detector comprises a first shift register, a second shift register, and a comparator, the input terminal of the first shift register being connected to the output terminal of the bidirectional counter of the regulating device, while the output terminal of this first shift register is connected to the input terminal of the second shift register, and in that the respective output terminals of the two shift registers are connected to the input terminals of the comparator, the contents of the second shift register being replaced, in a cyclic manner, by the contents of the first shift register, while the contents of the latter are replaced by the instantaneous reading of the bidirectional counter, and the contents of the two shift registers are, thereafter, compared with each other in the comparator, which emits an output signal if the contents of the first shift register exceed the contents of the second shift register.

16. Device according to claim 15, characterized in that the output terminal of the AND element is connected to a "preset enable" input terminal of the bidirectional counter, and that the contents of the bidirectional counter are replaced by the contents of the second shift register whenever a signal occurs at the output terminal of the AND element.

* * * * *